United States Patent
Saraswati et al.

(10) Patent No.: US 10,338,914 B2
(45) Date of Patent: *Jul. 2, 2019

(54) DYNAMICALLY APPLYING A PATCH TO A SHARED LIBRARY

(71) Applicant: Hewlett Packard Enterprise Development LP, Houston, TX (US)

(72) Inventors: Sujoy Saraswati, Bangalore (IN); Suprateeka Radhakrishna Hegde, Bangalore (IN); Deepti Kharbanda, Bangalore (IN); Abhay Padlia, Bangalore (IN); Rajesh Kumar Chaurasia, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/504,367

(22) PCT Filed: Oct. 27, 2014

(86) PCT No.: PCT/US2014/062398
§ 371 (c)(1),
(2) Date: Feb. 16, 2017

(87) PCT Pub. No.: WO2016/068845
PCT Pub. Date: May 6, 2016

(65) Prior Publication Data
US 2017/0242687 A1 Aug. 24, 2017

(30) Foreign Application Priority Data

Sep. 1, 2014 (IN) ............................ 4259/CHE/2014

(51) Int. Cl.
*G06F 9/44* (2018.01)
*G06F 8/656* (2018.01)
(Continued)

(52) U.S. Cl.
CPC ................ *G06F 8/656* (2018.02); *G06F 8/65* (2013.01); *G06F 9/44521* (2013.01)

(58) Field of Classification Search
None
See application file for complete search history.

(56) References Cited

U.S. PATENT DOCUMENTS 6,154,878 A 11/2000 Saboff
6,199,203 B1 6/2001 Saboff
(Continued)

FOREIGN PATENT DOCUMENTS

| CN | 1979418 | 6/2007 |
| JP | 2013105349 | 5/2013 |
| KR | 10-2006-0055752 A | 5/2006 |

OTHER PUBLICATIONS

"How to upgrade shared library without crash?", Unix & Linux Stack Exchange, Apr. 30, 2013, 3 Pgs.
(Continued)

*Primary Examiner* — Insun Kang
(74) *Attorney, Agent, or Firm* — Brooks, Cameron & Huebsch, PLLC (57) ABSTRACT

Some examples described herein relate to dynamically applying a patch to a shared library. An external process may be invoked to bring target processes that refer to a shared library, to a safe point. In response to a function call from a target process, amongst the target processes, to access a target function in the shared library, the function call may be forwarded to a special function in a dynamic loader, wherein the target function is a function to be patched in the shared library. The special function may determine whether a shared patch library, comprising a patched version of the target function or a new function, is loaded for the target process. In response to determination that the shared patch library is not loaded for the target process, the shared patch
(Continued)

library may be loaded only for the target process, and the request for the target function may be routed to the patched version of the target function or the new function, in the shared patch library.

18 Claims, 4 Drawing Sheets

(51) Int. Cl.
*G06F 8/65* (2018.01)
*G06F 9/445* (2018.01)

(56) References Cited

U.S. PATENT DOCUMENTS

| | | | |
|---|---|---|---|
| 6,460,178 B1 | 10/2002 | Chan et al. | |
| 6,622,300 B1 | 9/2003 | Krishnaswamy et al. | |
| 6,745,385 B1 | 6/2004 | Lupu et al. | |
| 6,988,263 B1* | 1/2006 | Hussain | G06F 11/323 714/E11.181 |
| 7,472,384 B1* | 12/2008 | Beloussov | G06F 8/656 717/168 |
| 7,784,044 B2 | 8/2010 | Buban et al. | |
| 8,286,238 B2 | 10/2012 | Durham et al. | |
| 8,607,208 B1* | 12/2013 | Arnold | G06F 8/656 717/153 |
| 8,677,348 B1* | 3/2014 | Ramanathpura | G06F 8/65 717/175 |
| 9,164,754 B1* | 10/2015 | Pohlack | G06F 8/658 |
| 9,696,989 B1* | 7/2017 | Korotaev | G06F 8/67 |
| 9,792,112 B2* | 10/2017 | Henry | G06F 8/665 |
| 2002/0029357 A1* | 3/2002 | Charnell | G06F 8/4442 714/5.11 |
| 2002/0100036 A1* | 7/2002 | Moshir | G06F 8/62 717/173 |
| 2004/0049667 A1* | 3/2004 | McCormick, Jr. | G06F 9/322 712/233 |
| 2004/0107416 A1* | 6/2004 | Buban | G06F 8/658 717/170 |
| 2005/0257208 A1* | 11/2005 | Blumfield | G06F 8/65 717/168 |
| 2006/0101181 A1* | 5/2006 | Post | G06F 9/45537 710/266 |
| 2006/0294430 A1* | 12/2006 | Bunker | G06F 8/65 714/38.1 |
| 2007/0174912 A1* | 7/2007 | Kraemer | G06F 21/552 726/23 |
| 2008/0083030 A1* | 4/2008 | Durham | G06F 8/656 726/22 |
| 2009/0187725 A1* | 7/2009 | Mencias | G06F 8/67 711/171 |
| 2009/0259999 A1 | 10/2009 | Srinivasan | |
| 2014/0007142 A1* | 1/2014 | Brown | G06F 9/44521 719/331 |
| 2014/0229939 A1* | 8/2014 | Dias de Assuncao | G06F 8/63 718/1 |
| 2014/0282468 A1* | 9/2014 | Millett | G06F 8/65 717/170 |
| 2014/0380295 A1* | 12/2014 | Chen | G06F 8/65 717/170 |
| 2015/0199283 A1* | 7/2015 | Epstein | G06F 12/1475 711/152 |
| 2015/0220320 A1* | 8/2015 | Chen | G06F 9/44536 717/170 |

OTHER PUBLICATIONS

International Searching Authority, The International Search Report and the Written Opinion, PCT/US2014/062398, dated May 15, 2015, 14 Pages.

* cited by examiner

DYNAMICALLY APPLYING A PATCH TO A SHARED LIBRARY

BACKGROUND

Computer programs installed in a computer system may be updated by applying a software patch (or patch). A software patch upon installation may provide protection against security threats, fix bugs, or generally improve the usability or performance of a computer program. Since a vulnerable computer program could cause a loss of valuable data, confidential information, downtime etc., software patches play an important role in keeping a computer program (and computer system) safe and up-to-date.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Software developers often release a series of security and feature patches to address various requirements or bugs found in the operating environment of a customer's computer systems. Most of these patch update mechanisms replace a defective binary on a target system and require a reboot or a restart of the affected computer application to bring the fix into effect. This brings the system up-to-date to the latest version of the target binary. These mechanisms are known as static patching. Thus, in static patching, a software update typically requires stopping and restarting an application. However, there are many scenarios where computer systems cannot afford to halt service. Dynamic or online patching allows a computer program of a running system to be dynamically updated with new code and data with-out requiring a reboot or downtime. Dynamic patching permits programs to be updated while they run. However, updating a shared library dynamically is challenging since it can potentially impact many applications and processes running on the system and sharing the shared library.

To address this issue, the present disclosure describes various examples for dynamically applying a patch to a shared library on a computer system. In an example, an initial testing operation may be performed related to a computer application that refers to a shared library. In response to the initial testing operation, an external process may be invoked to control target processes of the computer application, wherein the target processes are processes accessing the shared library. The external process may be used to bring the target processes to a safe point. In response to a request, from one of target processes that are brought to the safe point, to access a target function in the shared library, the request may be directed to a special function in a dynamic loader. The special function may be directed to determine whether a shared patch library, comprising a patched version of the target function or a new function, is loaded for the target process. In response to determination that the shared patch library is not loaded for the target process, dynamic loader may be directed to load the shared patch library only for the target process, and route the request for the target function to the patched version of the target function or the new function in the shared patch library.

Figure 1:
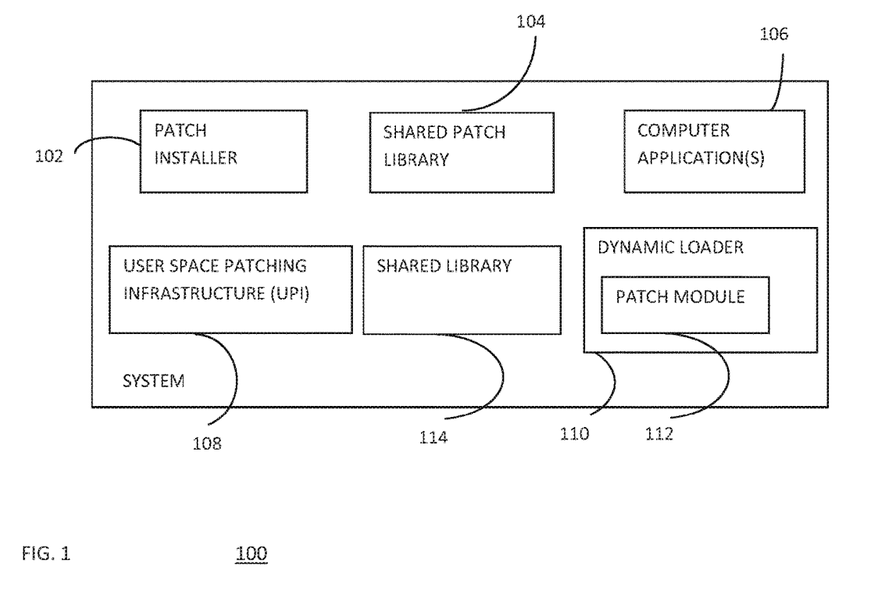
FIG. 1 illustrates a system for dynamically applying a patch to a shared library, according to an example.

FIG. 1 illustrates a system 100 for dynamically applying a patch to a shared library, according to an example. System 100 may include a patch installer 102, a shared patch library 104, one or more computer applications 106, a user space patching infrastructure 108, a dynamic loader 110, and a shared library 114. In an example, the aforesaid components of system 100 may be implemented as machine-readable instructions stored on a machine-readable storage medium. The machine-readable storage medium storing such instructions may be integrated with the system 100, or it may be an external medium that may be accessible to the system 100.

System 100 may be a computing device such as a desktop computer, a server, a notebook computer, a tablet computer, a mobile phone, a personal digital assistant (PDA), and the like.

Patch installer 102 may include machine-readable instructions to apply a patch to a shared library. As mentioned earlier, dynamic or online patching allows a computer program, such as shared library, of a running computer system to be dynamically updated with new code without requiring a reboot or downtime. In an example, the patch installer 102 may dynamically apply a patch to a shared library 114 referred to by one or more computer applications 106 present in the system 100 without requiring a reboot of the system. Patch installer 102 may include all the information and data (for example, in a file) required for applying a patch to a shared library 114. Shared library 114 may be referred to by one or more computer applications (for example, 106) or processes. In an instance, the functions that may need to be patched in the shared library 114 are modified to point to a special function in a dynamic loader 110 (described below). A reference to the special function is included in the shared library file by modifying the text or code section of the shared library 114. For example, a shared text write API, provided by the virtual memory subsystem of the operating system, may be used to modify the shared text section and ensure that the modified text section is shared across processes.

Shared patch library (or patch) 104 may include machine-readable instructions that update a shared library 114. For instance, shared patch library 104 may be used to improve or fix any issues associated with a shared library. In an example, shared patch library 104 may include a current version of a fix and metadata. In an example, a fix may include a current version of a changed function i.e. a patched version of a target function that is to be patched or a new function replacing a target function. In an example, the metadata may include a list of functions that are being patched in a shared library, any other data (such as patch level names, etc.) that a patching infrastructure (explained below) may need for carrying out the process, and information regarding the sequence in which the higher versions of a patch need to be installed on a target system. In an example, shared patch library may be referred to by one or more computer applications (for example, 106) or processes.

Computer application (or applications) 106 may include any type of software that may be implemented in the form of machine-readable instructions on a machine-readable storage medium. In an example, computer application 106 is a user space application i.e. a computer program that runs outside an operating system's kernel.

Patch installer may interact with a Dynamic Patch Daemon (DPD) process. The DPD process interfaces between the patch installer and the kernel or a user space patching infrastructure (described below). DPD process may store information regarding successful patching of several processes related to a shared library. Thus DPD may maintain a system level knowledge of the patching progress, when multiple instances of the same application need to be patched.

User space patching infrastructure (UPI) 108 may include machine-readable instructions to direct a user space patch application process. In an example, prior to applying a patch to a shared library (for example, 114), UPI 108 may determine whether the computer application(s) (for example, 106) referring to the shared library 114 is not excluded from the patching process. In an instance, UPI 108 may first check the patch metadata and determine if the patch is for a classified application that may be excluded from applying a dynamic patch. Binary Translators and Emulators like HP ARIES, Java Virtual Machine (JVM) and dynamic optimizers are some of the example applications that may be excluded. Upon detecting an attempt to apply a dynamic patch on any of the excluded applications, UPI 108 may report an appropriate message (for example, an error message) to a user.

In an example, UPI 108 may invoke an external process to control those processes that are to be patched. These processes may be called "target processes". The external process may bring all target processes to a safe point before proceeding further. A "safe point" in the context of dynamic patching may be defined to include a state of the application process where none of the functions that need to be patched exist in the application execution context. In an example, the aforesaid definition may be made available via patch metadata. Also, in an example, the target processes may be brought to a safe point by an external process, one at a time.

In some examples, the external process invoked by the UPI 108 to control target processes may find a function(s) that should not be there in the process execution state. These functions may be referred to as unsafe functions. The external process may use a tracing mechanism (for example, a ttrace or ptrace system call) to stop the execution of a process, examine the user space stack for all threads in the process, and verify if any of the unsafe functions are present on the stacks. If none of the unsafe functions are found on the stacks, the application process may be deemed to be at a safe point for applying a patch dynamically. Otherwise, the external process may resume the target process execution and stop it after an interval to carry out the safe point verification method again. If a predefined number of attempts to reach a safe point do not succeed, the external process may relinquish the execution control of the target process. The external process may also report such failure to a user via an appropriate message (for example, an error message). If a safe point is reached in the target process, patching may be performed while the target process is controlled by the external process. The external process, at this point, may interact with a dynamic loader (DLD) 110, which may be present in the application process context.

Dynamic loader (DLD) 110 may include machine-readable instructions that may be loaded into an application that uses shared libraries. In an example, a DLD 110 may be a shared library which is invoked automatically at startup time and loaded into memory for program execution. A DLD 110 may load other libraries in a process. The external process, described above, may utilize this functionality of DLD 110 and load a shared patch library in a target process address space by executing a DLD 110 function to load a library (for example, dlopen( ) or shl_load( )).

In the example of FIG. 1, DLD 110 may include a patch module 112 to route a function call for a target function to a patched version of a target function or a new function, in a shared patch library. The term "module" may refer to a software component (machine executable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computing device. In an example, patch module may be a special function in the dynamic loader.

In an example, in response to a request, from one of the target processes that are brought to the safe point, to access a target function in the shared library, the request may be directed to a special function in the dynamic loader. As mentioned earlier, the shared text section of the shared library may be modified to include a reference to the special function in the shared library. Upon receiving the request, the special function may determine whether a shared patch library, comprising a patched version of the target function or a new function, is loaded for the target process that had made the request. In response to determination that the shared patch library is not loaded for the target process, dynamic loader may load the shared patch library for the target process, and route the request for the target function to the patched version of the target function or the new function, in the shared patch library. Thus, the target function in the shared library is patched. Any subsequent call to the target function by the same process may get directed, by the DLD, to the patched version of the target function or the new function, in the shared patch library. It may be noted that the dynamic loader loads the shared patch library only for the target process that had made the request.

If it is determined that the shared patch library is already loaded for the target process, dynamic loader may simply route the request for the target function to the patched version of the target function or the new function, in the shared patch library. In such case, the dynamic loader would not load the shared patch library again.

In an example, the shared library may receive a request from another target process, amongst the target processes that had reached the safe point, to access the target function in the shared library. In this case also, such request may be directed to the special function in the dynamic loader. The special function may determine whether the shared patch library is loaded for said target process. In response to determination that the shared patch library is not loaded for said target process, dynamic loader may load the shared patch library for said target process, and route the request for the target function to the patched version of the target function or the new function, in the shared patch library. Thus, the target function in the shared library is patched. Any subsequent call to the target function by the said target process may get directed, by the DLD, to the patched version of the target function or the new function, in the shared patch library. It may be noted that the dynamic loader loads the shared patch library only for said target process that had made the request.

In like manner, all those target processes that access the shared library and had reached the safe point may get patched. A function in the shared library is patched only when a process invokes it in a function call after it (i.e. the process) had reached a safe point. Thus, a delayed or on-demand patching is followed, wherein all target processes that access the shared library and had reached the safe point are not patched at the same time. Rather, each process may be patched only when it invokes a function call for a function in the shared library subsequent to the safe point stage.

Figure 2:
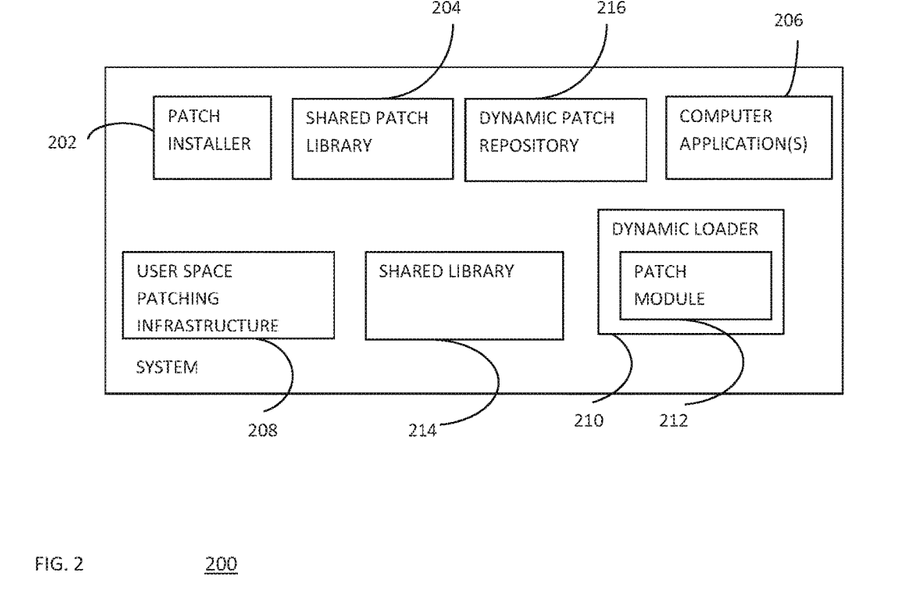
FIG. 2 illustrates a system for dynamically applying a patch to a shared library, according to an example.

FIG. 2 illustrates a system 200 for dynamically applying a patch to a computer application, according to an example. System 200 may be similar to system 100 described above. Accordingly, components of system 200 that are similarly named and illustrated in system 100 may be considered similar. In the example of FIG. 2, system 200 may include a patch installer 202, a shared patch library 204, one or more computer applications 206, a user space patching infrastructure 208, a dynamic loader 210, a shared library 214, and a dynamic patch registry (DPR) 216. In an example, the aforesaid components of system 200 may be implemented as machine-readable instructions stored on a machine-readable storage medium. The machine-readable storage medium storing such instructions may be integrated with the system 200, or it may be an external medium that may be accessible to the system 200.

In the example of FIG. 2, the dynamic patch registry (DPR) 216 may be a repository that stores the function entry blocks (function epilogues) of the target processes that reach a safe point. In an example, such function entry blocks may be used to rollback a patch applied to a target function. Said differently, in the event a patch rollback is required, aforesaid entries in the DPR may be used to restore a computer application to its previous state.

Figure 3:
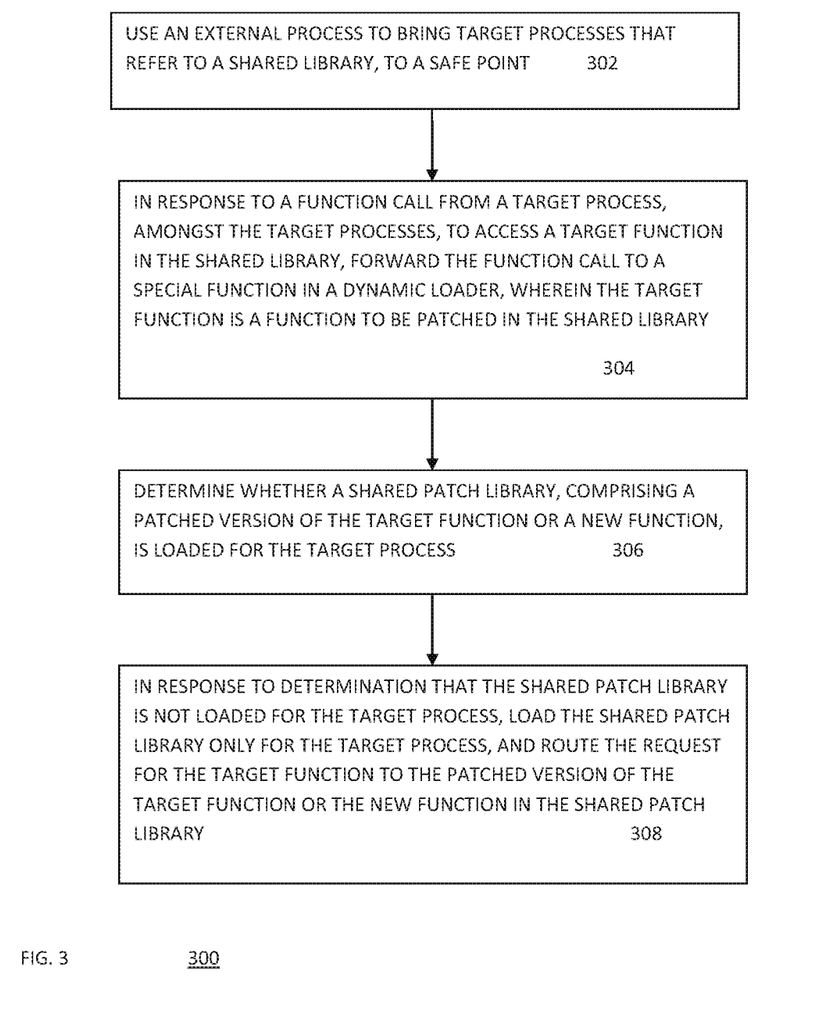
FIG. 3 illustrates a method of dynamically applying a patch to a shared library, according to an example.

FIG. 3 illustrates a method 300 for dynamically applying a patch to a shared library, according to an example.

At block 302, an external process may be used to bring target processes of a computer application or plurality of computer applications that are referring to a shared library, to a safe point. As mentioned above, a safe point may include a state of the application process where none of the functions that need to be patched exist in the application execution context. In an example, the external process may bring the target processes to the safe point by preventing execution of the target processes until no unsafe functions in a process execution state exist. The external process may use a tracing mechanism to temporarily stop the execution of the target processes, examine the user space stack for all threads in the processes, and verify if any of the unsafe functions is present on the stacks. If none of the unsafe functions are found on the stacks, the application processes may be deemed to be at a safe point for applying a patch to a target function. Or else, the external process may resume a target process execution and stop the same after an interval to carry out the safe point verification method again. In an example, an external process may bring the target processes to a safe point one at a time.

At block 304, in response to a function call, from one of the target processes that are brought to the safe point, to access a target function in the shared library, the function call may be directed to a special function in the dynamic loader.

At block 306, upon receiving the request, the special function may determine whether a shared patch library, comprising a patched version of the target function or a new function, is loaded for the target process that had made the request.

At block 308, in response to determination that the shared patch library is not loaded for the target process, dynamic loader may load the shared patch library for the target process, and route the request for the target function to the patched version of the target function or the new function, in the shared patch library. Thus, the target function in the shared library is patched. Any subsequent call to the target function by the same process may get directed, by the OLD, to the patched version of the target function or the new function, in the shared patch library. It may be noted that the dynamic loader loads the shared patch library only for the target process that had made the request.

In the event it is determined that the shared patch library is already loaded for the target process, dynamic loader may route the request for the target function to the patched version of the target function or the new function, in the shared patch library. In such case, the dynamic loader may not load the shared patch library again.

Figure 4:
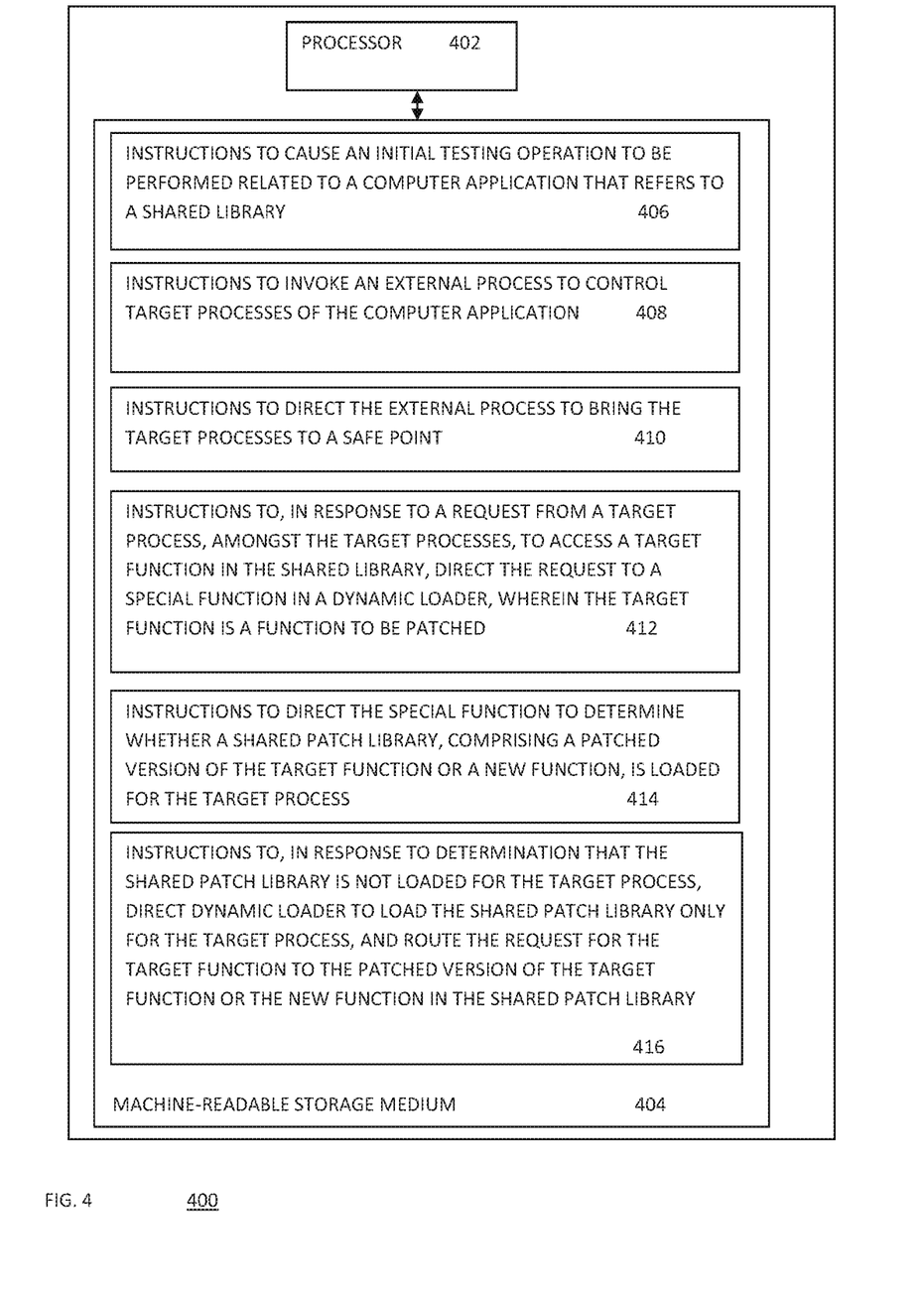
FIG. 4 illustrates a system for dynamically applying a patch to a shared library, according to an example.

FIG. 4 illustrates a system 400 for dynamically applying a software patch to a shared library, according to an example.

System 400 includes a processor 402 and a machine-readable storage medium 404 communicatively coupled through a system bus. In an example, system 400 may be analogous to system 100 of FIG. 1 or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 404 may be a non-transitory machine-readable medium. Machine-readable storage medium 404 may store monitoring instructions 406, 408, 410, 412, 414 and 416. In an example, instructions 406 may be executed by processor 402 to cause an initial testing operation to be performed related to a computer application that refers to a shared library. In an example, the instructions to cause the initial testing operation may include instructions to determine whether the computer application is not excluded from applying a patch. In another example, the instructions to cause the initial testing operation may include instructions to determine whether the computer application is a user space computer application.

In response to the initial testing operation, instructions 408 may be executed by processor 402 to invoke an external process to control target processes of the computer application. The "target processes" may be those processes of the computer application that may be referring to the shared library. Instructions 410 may be executed by processor 402 to direct the external process to bring said target processes of the computer application to a safe point. Instructions 412 may be executed by processor 402 to, in response to a request from a target process, amongst the target processes, to access a target function in the shared library, direct the request to a special function in a dynamic loader, wherein the target function is a function to be patched. Instructions 414 may be executed by processor 402 to direct the special function to determine whether a shared patch library, comprising a patched version of the target function or a new function, is loaded for the target process. Instructions 414 may be executed by processor 402 to in response to determination that the shared patch library is not loaded for the target process, direct dynamic loader to load the shared patch library only for the target process, and route the request for the target function to the patched version of the target function or the new function in the shared patch library.

In an example, machine-readable storage medium 404 may include further instructions to, in response to determination that the shared patch library is loaded for the target process, direct dynamic loader to route the request for the target function to the patched version of the target function or the new function in the shared patch library.

In an example, the instructions to direct the request to a special function may include instructions to: in response to a request from another target process, amongst the target processes, to access the target function in the shared library, direct the request from the another target process to the special function in the dynamic loader; direct the special function to determine whether the shared patch library, comprising a patched version of the target function or a new function, is loaded for the another target process; and, in response to determination that the shared patch library is not loaded for the another target process, direct dynamic loader to load the shared patch library only for the another target process, and route the request for the target function to the patched version of the target function or the new function in the shared patch library.

For the purpose of simplicity of explanation, the example methods of FIG. 3 is shown as executing serially, however it is to be understood and appreciated that the present and other examples are not limited by the illustrated order. The example systems of FIGS. 1, 2 and 4, and method of FIG. 3 may be implemented in the form of a computer program product including computer-executable instructions, such as program code, which may be run on any suitable computing device in conjunction with a suitable operating system (for example, MICROSOFT WINDOWS, LINUX UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution.

The invention claimed is:

1. A non-transitory machine-readable storage medium comprising instructions to dynamically apply a patch to a shared library, the instructions executable by a processor to:
   perform an initial testing operation related to a computer application that refers to a shared library;
   in response to the initial testing operation, invoke an external process to control target processes of the computer application, wherein the target processes refer to the shared library;
   direct the external process to:
      abort execution of the target processes;
      examine a user stack for threads corresponding to the target processes to determine whether the target processes are at a safe point; and
      upon a determination that the target processes are at an unsafe point, resume the target processes for an interval prior to a reexamination;
   in response to a request from a target process, amongst the target processes determined to be at the safe point, to access a target function in the shared library, direct the request to a special function in a dynamic loader, wherein the target function is a function to be patched, and wherein the target process is dynamically updated when it invokes the target function in the shared library subsequent to reaching the safe point;
   direct the special function to determine whether a shared patch library, comprising a patched version of the target function or a new function, is loaded for the target process; and in response to determination that the shared patch library is not loaded for the target process, direct dynamic loader to load the shared patch library only for the target process, and route the request for the target function to the patched version of the target function or the new function, in the shared patch library.

2. The storage medium of claim 1, wherein the instructions to determine comprise instructions to in response to determination that the shared patch library is loaded for the target process, direct the dynamic loader to route the request for the target function to the patched version of the target function or the new function in the shared patch library.

3. The storage medium of claim 1, wherein the instructions to direct the request to a special function include instructions to:
   in response to a request from another target process, amongst the target processes, to access the target function in the shared library, direct the request from said another target process to the special function in the dynamic loader;
   direct the special function to determine whether the shared patch library is loaded for the another target process; and
   in response to determination that the shared patch library is not loaded for the another target process, direct the dynamic loader to load the shared patch library only for the another target process, and route the request for the target function to the patched version of the target function or the new function in the shared patch library.

4. The storage medium of claim 1, wherein the instructions to direct the request to a special function include instructions to modify a text section of the shared library to direct the target function of the shared library to the special function in the dynamic loader.

5. The storage medium of claim 1, wherein the instructions to cause the initial testing operation include instructions to determine whether the computer application is not excluded from applying a patch.

6. The storage medium of claim 1, wherein the instructions to cause the initial testing operation include instructions to determine whether the computer application is a user space computer application.

7. The medium of claim 1, wherein the instructions are further executable by the processor to update a Procedure Linkage Table in response to a determination that the target function has been patched.

8. A method for dynamically applying a patch to a shared library, comprising:
   using an external process to bring target processes that refer to a shared library to a safe point, wherein bringing the target processes to the safe point comprises:
      examining a user stack for threads corresponding to the target processes to determine whether an unsafe function is present in the target processes;
      resuming the target processes for an interval upon a determination that the unsafe function is present in the target processes; and
      verifying that the unsafe function is absent from the user stack in response to a function call from a target process, amongst the target processes determined to be at the safe point, to access a target function in the shared library;
   forwarding the function call to a special function in a dynamic loader, wherein the target function is a function to be patched in the shared library, and wherein the target process is dynamically updated when it invokes the target function in the shared library subsequent to reaching the safe point;
   determining, by the special function, whether a shared patch library, comprising a patched version of the target function or a new function, is loaded for the target process; and
   in response to determination that the shared patch library is not loaded for the target process, loading the shared patch library only for the target process, and routing the request for the target function to the patched version of the target function or the new function, in the shared patch library.

9. The method of claim 8, further comprising in response to determination that the shared patch library is loaded for the target process, routing the request for the target function to the patched version of the target function or the new function in the shared patch library.

10. The method of claim 8, wherein the target processes are brought to the safe point one at a time.

11. The method of claim 8, further comprising:
   in response to a function call from another target process, amongst the target processes, to access the target function in the shared library, forwarding the function call from the another target process to the special function in the dynamic loader;
   determining whether the shared patch library, comprising a patched version of the target function or a new function, is loaded for the another target process; and
   in response to determination that the shared patch library is not loaded for the another target process, loading the shared patch library only for the another target process, and routing the function call for the target function to the patched version of the target function or the new function in the shared patch library.

12. The method of claim 8, further comprising modifying a shared text section of the shared library to include a reference to the special function.

13. The method of claim 8, further comprising updating a Procedure Linkage Table entry by updating a pointer to the shared patch library.

14. A system for dynamically applying a patch to a shared library, comprising:
   a processor;
   a non-transitory machine-readable storage medium;
   a patch installer to apply a patch to a shared library;
   a user space patching infrastructure that interfaces with the patch installer via a Dynamic Patch Daemon (DPD) process, to invoke an external process, wherein the external process is to bring target processes of a plurality of computer applications, referring to the shared library, to a safe point, wherein the external process is to bring target processes to the safe point by:
      examining a user space stack for threads corresponding to the target processes;
      determining whether there are any unsafe functions present on the user space stack, wherein, upon a determining that there are unsafe functions present on the user space stack, the external process resumes the target processes for an interval; and
   a patch module to:
      in response to a request from one of the target processes, determined to be at the safe point, to access a target function in the shared library, determine whether a shared patch library, comprising a patched version of the target function or a new function is loaded for the target process, wherein the target function is a function to be patched in the shared library, and wherein the target process is dynamically updated when it invokes the target function in the shared library subsequent to reaching the safe point; and
      in response to determination that the shared patch library is not loaded for the target process, load the shared patch library only for the target process, and route the request for the target function to the patched version of the target function or the new function, in the shared patch library.

15. The system of claim 14, wherein the patch module to in response to determination that the shared patch library is loaded for one of the target processes, route the request for the target function to the patched version of the target function or the new function in the shared patch library.

16. The system of claim 14, further comprising a Dynamic Patch Registry to store a function entry block for one of the target processes, wherein the function entry block is used to rollback the patch applied to the target function.

17. The system of claim 14, wherein the user space patching infrastructure is to determine from a patch metadata whether the plurality of computer applications is not excluded from applying the patch.

18. The system of claim 14, wherein the external process is to bring target processes to the safe point concurrently.

* * * * *